United States Patent Office 3,795,657

Patented Mar. 5, 1974

1

3,795,657

EPOXY RESIN COMPOSITIONS CONTAINING AROMATIC BIGUANIDES AS LATENT CURING AGENTS THEREFOR

Robert William Howsam and Paul Alan Larson, Lake Jackson, Tex., assignors to The Dow Chemical Company, Midland, Mich.

No Drawing. Filed Aug. 21, 1972, Ser. No. 282,494
Int. Cl. C08g *30/14*
U.S. Cl. 260—47 EN 10 Claims

ABSTRACT OF THE DISCLOSURE

New compounds useful as latent curing agents for epoxy resins are prepared by reacting an aromatic diamine, e.g. methylenedianiline, with dicyandiamide. These latent curing agents will cure epoxy resins with or without accelerators in shorter times than accelerated dicyandiamide cured systems and at lower temperatures than unaccelerated dicyandiamide systems.

This invention relates to new latent curing agents for epoxy resins, and to epoxy resins in admixture with such curing agents and the cured products thereof.

Dicyandiamide is a well known latent curing agent for epoxy resins. To obtain adequate cure in desirable and practical times and temperatures, however, the dicyandiamide-epoxy resin mixtures must be used with an accelerator.

It has now been discovered that the biguanides, formed by reacting aromatic diamines with dicyandiamide, will cure epoxy resins at lower temperatures than dicyandiamide when using equivalent amounts of accelerators. Without added accelerators these biguanides will cure epoxy resins faster than accelerated dicyandiamide at the same temperatures. Mixtures of these biguanides with epoxy resins when formulated as paints or varnishes are quite stable over extended periods of time and maintain their curability.

The new latent curing agents are represented by the general formulae (I)

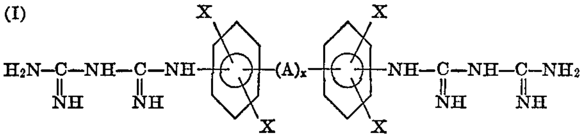

and (II)

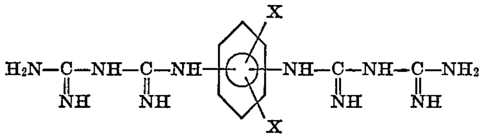

wherein A is a divalent hydrocarbon radical having from 1 to about 6 carbon atoms,

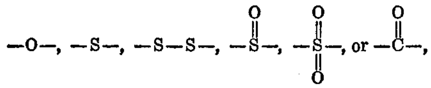

each X is independently hydrogen, chlorine or bromine, and *x* has a value of 0 or 1.

The new curing agents of the present invention are prepared by forming the hydrohalide salt of the desired aromatic diamine by reaction of said aromatic diamine with a hydrogen halide at a temperature of from about 0° to about 50° C. in an aqueous medium and subsequently reacting the resultant aromatic diamine hydrohalide salt with dicyandiamide in a molar ratio of at least 2 moles of dicyandiamide per 1 mole of aromatic diamine hydrohalide at a temperature of from about 90° to about 100° C. for a time sufficient to complete the reaction. Then a stoichiometric excess of an alkali metal hydroxide or alkaline earth metal hydroxide is added to neutralize the hydrohalide salt thereby producing the desired product which may be recovered by washing with water and subsequently with an alcohol such as, for example, ethanol or methanol.

2

Suitable aromatic diamines which may be reacted with dicyandiamide to prepare the latent curing agents of the present invention may be represented by the general formulae (III)

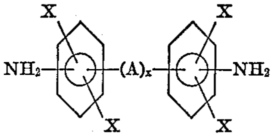

and (IV)

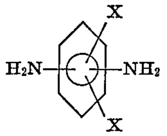

wherein A, X, and *x* are as defined in Formulae I and II and such diamines include, for example, methylene dianiline-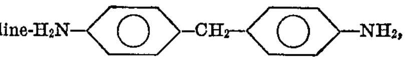

m-phenylenediamine—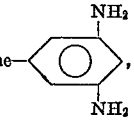

bis(aminophenyl)sulfone—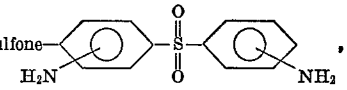

bis(aminophenyl)oxide—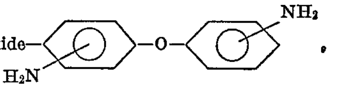

bis(aminophenyl)sulfide—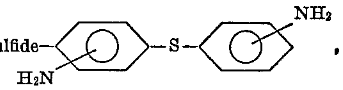

bis(aminophenyl)sulfoxide—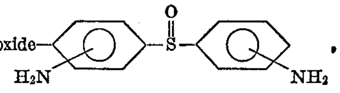

bis(aminophenyl)ketone—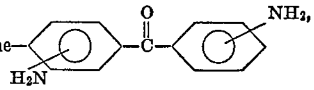

bis(aminophenyl)disulfide—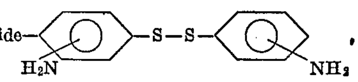

4,4'-methylene-bis(2-chloroaniline)-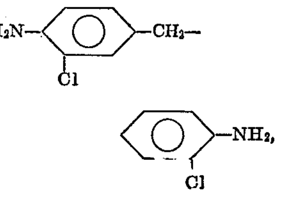

and the like and mixtures thereof.

The curable compositions of the present invention comprise mixtures of (A) an epoxy resin of the polyglycidyl ether type having more than one 1,2-epoxy group and (B) one or more of the compounds represented by Formulae I and II;

wherein the ratio of B:A is such as to provide an amine hydrogen: epoxide equivalent ratio of from about 0.8:1 to about 2:1 and preferably from about 1:1 to about 1.6:1.

The curable compositions of the present invention may also contain various modifiers such as fillers, extenders, pigments, accelerators and other modifiers such as carboxyl-containing polymers, urethanes, mixtures of any of such modifiers and the like. They may also be modified to contain any of the other well known curing agents such as amines, and anhydrides, imidazoles and the like. For example, accelerators useful with dicyandiamide, such as 2-methylimidazole, benzyl dimethylamine, chlorophenyl 3,3-dimethyl urea and others may be employed with the biguanide curing agents. The curable compositions are useful in the preparation of adhesives, laminates, powder coatings, castings and the like.

EXAMPLE 1

Preparation of methylenedianiline-dicyandiamide adduct (MDA/DICY)

To a stainless steel reactor equipped with a stirrer, reflux condenser and temperature control means containing 35 lbs. of water was slowly added 15.5 lbs. of concentrated HCl. Then 15.3 lbs. of methylenedianiline was added and the temperature raised to 100° C. and maintained thereat until the methylenedianiline had dissolved. When the methylenedianiline had dissolved, 13 lbs. of dicyandiamide was added and after refluxing (100° C.) for two hours, 100 lbs. of 20° C. water was added followed by the addition of 155 lbs. of 5% aqueous NaOH. After stirring for about 5 minutes, the product was centrifuged, washed with 40 lbs. of water, then centrifuged and washed again with 40 lbs. of water. After contrifuging again, the product was washed with 20 lbs. of methanol and centrifuged and washed again with 20 lbs. of methanol. After centrifuging and drying at 80° C. under vacuum, twelve lbs. of product (40% yield) of a white solid having a melting point of 210° C., an amine hydrogen equivalent weight of 33.8 was recovered.

EXAMPLE 2

Preparation of methylene di-o-chloro aniline-dicyandiamide adduct (MOCA/DICY)

To a glass reaction vessel containing 300 ml. of water, equipped with a stirrer, reflux condenser and temperature control means, 104 grams of concentrated HCl was slowly added. Then 133.5 grams (0.5 mole) of methylene di-o-chloroaniline (MOCA) was added and the temperature raised to about 100° C. and maintained thereat until the MOCA had dissolved. After the MOCA had dissolved, 84 grams (1 mole) of dicyandiamide was added and the contents were refluxed (100° C.) for about twenty minutes. The contents were cooled by the addition of water in an amount of 2.5 times the original volume and the contents poured into a container containing 1000 ml. of 5% aqueous NaOH. The white precipitate was washed twice with 500 ml. of water to remove salt, caustic and any unreacted dicyandiamide. The white powder was then washed with 2000 ml. of ethanol followed by 500 ml. of methylene chloride until the filtrate was no longer discolored. About 90 grams (41% yield) of a white powder was obtained which had a melting point of 215° C. and an amine hydrogen equivalent weight of 35.2. The equivalent weight was calculated from the elemental analysis and based on nitrogen content.

EXAMPLE 3

Preparation of metaphenylene diamine-dicyandiamide adduct (MPDA/DICY)

To a reaction vessel equipped with a stirrer, reflux condenser and temperature control means and containing 100 grams of water and 100 grams concentrated HCl was dissolved 53 grams (0.5 mole) of m-phenylenediamine. The solution was heated and 84 grams (1.0 mole) of dicyandiamide was added and the contents refluxed for 2.5 hours. The solution was cooled with 50 ml. of water and poured into 50 ml. of a 25% aqueous solution of NaOH, stirred and filtered and 110 grams of crude product was recovered.

The crude product, which weighed 40 grams, was refluxed in 50 ml. of a 4:1 by volume mixture of ethanol and water for 1 to 2 minutes, then cooled, filtered and washed with ethanol and then methylene chloride, as in Example 2 above, until a clear filtrate was obtained. After being dried in an oven at 50° C., the pure white solid product, which weighed 20.6 grams, had a melting point of 172° C. and an amine hydrogen equivalent weight of 22.7 calculated from the elemental analysis.

EXAMPLE 4

An epoxy resin adhesive was formulated from an MDA/DICY adduct prepared in a manner similar to Example 1. For comparative purposes, an adhesive was also prepared using the same epoxy resin with dicyandiamide. The composition of the adhesives are given in Table I and the properties are given in Table II.

TABLE I

| | Sample No. | | | |
|---|---|---|---|---|
| Component | A–I [5] | A–C [6] | B–I | B–C |
| Urethane modified DGEBA [1], gms | 10 | 10 | | |
| CTBN modified DGEBA [2], gms | | | 10 | 10 |
| MDA/DICY biguanide | [4] S | | S | |
| Accelerator [3], gms | .1 | .1 | .1 | .1 |
| Dicyandiamide | | S | | S |
| Aluminum powder, gms | 7 | 7 | 7 | 7 |
| Colloidal silica, gm | 0.5 | 0.5 | 0.5 | 0.5 |

[1] Urethane modified DGEBA is a diglycidyl ether of bisphenol A having an EEW of about 189 modified with 4.2 phr. tetraethylene glycerol, 20 phr. of an adduct of a glycerine initiated polyoxypropylene glycol having an average molecular weight of about 2,700 with toluenediisocyanate, said adduct containing 9% by weight free NCO groups, said urethane modified DGEBA being prepared by the procedure described in U.S. 3,525,779 and wherein said urethane modified DGEBA had an average EEW of about 236.

[2] CTBN modified DGEBA is a diglycidyl ether of bisphenol A having an average EEW of about 189 modified by reaction with 10 phr. of a carboxyl containing butadiene-acrylonitrile copolymer containing about 18.6% acrylonitrile and having an average molecular weight of about 2,000 said reaction conducted in the presence of about 1% by weight of DMP 30 as a catalyst and said CTBN modified DGEBA had an average EEW of about 232.

[3] The accelerator was a composition containing 82% dicyandiamide, 17% 2-methyl imidazole and 1% by weight of colloidal silica.

[4] S=Stoichiometric quantity.

[5] I=Example of the present invention.

[6] C=Comparative experiment.

TABLE II

| | Sample No. | | | |
|---|---|---|---|---|
| Cure schedule and property | A–I | A–C | B–I | B–C |
| Lap shear strength, psi.: | | | | |
| 120° C./60 min | 5,200 | [1] 0 | 3,950 | [1] 0 |
| 120° C./18 hours | [2] N.D. | 4,620 | N.D. | 5,200 |
| Peel strength, p.s.i.: | | | | |
| 120° C./45 min | [3] 98 | [1] 0 | [3] 52 | [1] 0 |
| 120° C./18 hours | N.D. | 45 | N.D. | 90 |

[1] Sample did not cure.

[2] N.D.=not determined.

[3] Average of 3 test specimens.

The results in Table II show that the formulations of the invention (A–I and B–I) were superior to the dicyandiamide (DICY) containing resins (A–C and B–C) when the cure was for 45 or 60 minutes at 120° C. since neither of the DICY containing formulations were cured under those conditions. When the comparative urethane modified formulation (A–C) was heated sufficiently long to effect a cure, both shear and peel strengths were inferior to those same properties obtained at a lesser time for the formulation of the invention (A–I). When the comparative CTBN modified formulation (B–C) was heated sufficiently long, both shear and peel strengths are better than the same properties of the formulation of the invention (B–I). Nevertheless, these properties for the formulation of the invention are acceptable and they were obtained in a much shorter cure time.

EXAMPLE 5

Epoxy resin powder coatings were prepared employing the curing agent of the present invention and also from other curing agents for comparative purposes. The powder coating formulation was as follows:

300 grams of an epoxy resin of the diglycidyl ether of bisphenol A having an average EEW of about 800,
90 grams of a mixture containing 90% of the above 800 EEW epoxy resin and 10% of Modaflow® (a copolymer of ethylhexyl acrylate and ethyl acrylate) as a flow control agent.
192 grams of $TiO_2$ pigment.

Quantities of various curing agents are indicated in the following Table III which gives the results of the 20° gloss test and the resistance to methyl ethyl ketone exposure.

| | Measured at room temp. | Measured at 300° F. | Measured at room temp. after 2 hr. water boil |
|---|---|---|---|
| Flex modulus | $6.1 \times 10^5$ | | $4.9 \times 10^5$ |
| Flex strength | 89,000 | 7,600 | 70,000 |

These are equivalent or better than conventionally cured systems using accelerated DICY.

A typical accelerated DICY system is as follows (Formulation D)

| | |
|---|---|
| D.E.R.® 661 (A80) | 125 |
| Dicyandiamide (4 phr.) | 4 |
| Dimethylformamide | 15 |
| Dowanol® EM | 15 |
| Acetone | 55 |
| Benzyldimethyl amine (0.3 phr.) | 0.3 |

Formulation D includes strong solvents such as dimethylformamide (DMF) to prevent precipitation of the DICY. The biguanide formulation contains no DMF and yet showed no evidence of precipitation over a one-month storage period at room temperature.

To show latency or drift in cure rate with age "stroke cure" gel time tests were performed on the two varnishes above. The results are shown in the following graphic representation:

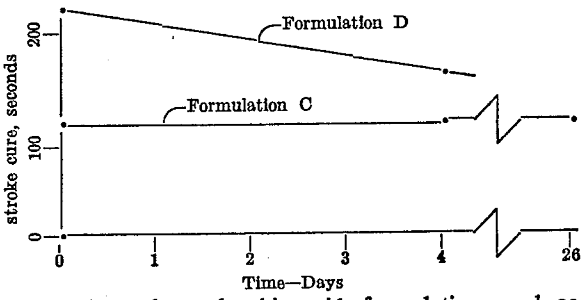

The above shows that biguanide formulations, such as Formulation C, have much better combination of rapid cure with long shelf life than do the conventional DICY systems such as Formulation D.

D.E.R.® 661 (A80) is the registered trademark of the Dow Chemical Company for its brand of a diglycidyl ether having the following formula:

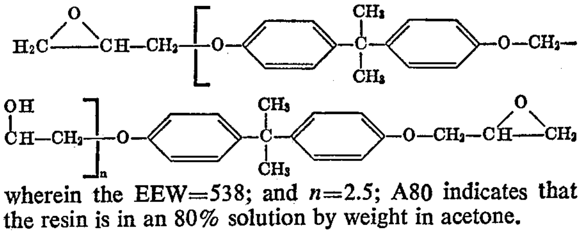

wherein the EEW=538; and $n$=2.5; A80 indicates that the resin is in an 80% solution by weight in acetone.

TABLE III

| Equivalents of curing agent per equivalent of epoxy resin | MDA/DICY [1] | | MOCA/DICY [2] | | DMPBG [3] | | "DICY" [4] | |
|---|---|---|---|---|---|---|---|---|
| | A [5] (percent) | B [6] (sec.) | A (percent) | B (sec.) | A (percent) | B (sec.) | A (percent) | B (sec.) |
| 0.8 | 22 | 240 | 20 | 230 | 75 | 80 | 70 | 75 |
| 1.0 | 22 | 810 | 21 | 420 | 78 | 315 | 96 | 810 |
| 1.2 | 38 | 810 | 27 | 900 | 85 | 330 | 81 | 705 |
| 1.6 | 50 | 960 | [7] N.D. | N.D. | N.D. | N.D. | 57 | 900 |
| 2.0 | 58 | <600 | N.D. | N.D. | N.D. | N.D. | N.D. | N.D. |

[1] MDA/DICY is bis-(4-biguanidyl phenyl) methane as prepared by a procedure similar to Example 1.
[2] MOCA/DICY is bis(4-biguanidyl-2-chlorophenyl) methane as prepared by a procedure similar to Example 2.
[3] DMPBG is 2,6-dimethylphenyl biguanide employed for comparative purposes (as described in U.S. 3,631,149).
[4] "DICY" is an accelerated composition containing 82% dicyandiamide, 17% 2-methylimidazole and 1% colloidal silica (all by wt.).
[5] A is the 20° gloss properties as determined by the procedures of ASTM D-523. The values are reported as percent gloss retention.
[6] B is the resistance to methylethyl ketone as determined by submerging the cured coating under a small watch glass containing MEK for a given number of seconds and then rubbing the coating with a wooden spatula to test for softening and breakage of the film. The values given are times (in seconds) submerged required for softening and breaking.
[7] N.D. indicates the value was not determined.
NOTE.—Cure schedule=175° for 25 minutes.

The results in Table III show that the curing agents of the invention can be used to control the gloss by varying the amount of curing agent (biguanide), whereas with the "DICY" and DMPBG the effect is fairly constant regardless of their amount. The formulations containing MDA/DICY and MOCA/DICY as curing agents are generally more solvent resistant than the comparative formulations using the curing agents of the art.

The curing agents (biguanides) of the present invention when used in varnish formulations have one or more of the following advantages over the use of dicyandiamide:

(1) better solubility in less polar solvents,
(2) can be used without accelerator,
(3) no crystallization in B-stage (or prepreg) resins,
(4) no aging needed as do accelerated dicyandiamide formulations,
(5) no precipitation from epoxy mixtures as do dicyandiamides, and
(6) improved latency.

EXAMPLE 6

A varnish solution using MDA/DICY was made up as follows: (Formulation C)

| | |
|---|---|
| D.E.R.® 661 (A80) | 125 |
| Dowanol® EM | 25 |
| Acetone | 60 |
| Biguanide (5.4 phr.) | 5.4 |

This varnish was used to prepare multi-ply glass reinforced electrical laminate board having the following properties: (Cure 1 hr. at 350° F.)

Dowanol® EM is the registered trademark of The Dow Chemical Company for its brand of the monomethyl ether of ethylene glycol.

The preceding examples clearly demonstrate that the curing agents of the present invention (1) cure at lower temperatures than dicyandiamide; or more quickly at same temperature;
(2) confer better solvent resistance to ordinary solvents than those compounds having only one biguanide group per molecule;
(3) make it possible to prepare semi-gloss epoxy resin coatings which are not possible from compounds having only one biguanide group per molecule and which are not obtainable with dicyandiamide at low equivalents of dicyandiamide, i.e. below about 1.6 eq. of dicyandiamide/eq. of epoxy resin;
(4) possess better solubility in simple mixtures of less polar solvents;
(5) while accelerators may be used they are not required; and
(6) have better shelf life than formulations known to the art.

We claim:

1. An epoxy resin composition curable upon heating to an insoluble infusable product which comprises in admixture (A) an epoxy resin having more than one glycidyl ether group and (B) a compound of the formula selected from the group consisting of (I)

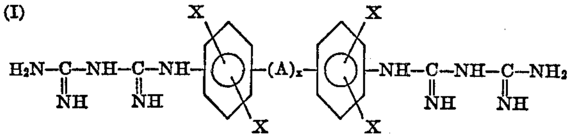

and (II)

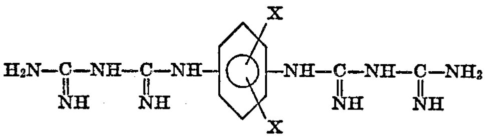

wherein A is a divalent hydrocarbon radical having from 1 to about 6 carbon atoms,

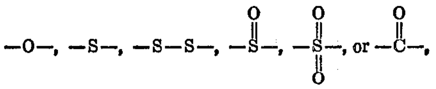

each X is independently hydrogen, chlorine or bromine, and $x$ has a value of 0 or 1, wherein the ratio of B:A is such as to provide an amine hydrogen:epoxide equivalent ratio of from about 0.8:1 to about 2:1.

2. The epoxy resin composition of claim 1 wherein Component B is a compound represented by Formula I.

3. An epoxy resin composition of claim 1 wherein in Component B, A is $—CH_2—$, X is hydrogen and $x$ is 1.

4. An epoxy resin composition of claim 1 wherein A is $—CH_2—$, at least one X on each aromatic ring is chlorine and $x$ is 1.

5. The thermoset product resulting from heating the composition of claim 1.

6. The thermoset product resulting from heating the composition of claim 3.

7. The thermoset product resulting from heating the composition of claim 4.

8. The composition of claim 1 wherein an amine curing accelerator is employed.

9. The composition of claim 8 wherein the accelerator is an imidazole compound.

10. The composition of claim 9 wherein the imidazole compound is 2-methyl imidazole.

References Cited

UNITED STATES PATENTS 3,631,149 12/1971 Gempeler ........... 260—47

WILLIAM SHORT, Primary Examiner

U.S. Cl. X.R.

117—124 E; 161—185; 260—2 N, 32.6 R, 32.8 Ep, 33.2 Ep, 37 Ep, 47 EC, 49, 79, 565, 830 TW, 836